United States Patent
Moore et al.

(10) Patent No.: US 7,300,697 B2
(45) Date of Patent: Nov. 27, 2007

(54) REINFORCEMENT ARRAY FOR HIGH MODULUS REINFORCEMENT OF COMPOSITES

(75) Inventors: Thomas S Moore, Oxford, MI (US); Gilbert B Chapman, II, Southfield, MI (US)

(73) Assignee: Chrysler LLC, Auburn Hills, MI (US)

( * ) Notice: Subject to any disclaimer, the term of this patent is extended or adjusted under 35 U.S.C. 154(b) by 73 days.

(21) Appl. No.: 10/912,350

(22) Filed: Aug. 5, 2004

(65) Prior Publication Data

US 2005/0008844 A1 Jan. 13, 2005

Related U.S. Application Data

(63) Continuation of application No. 09/976,349, filed on Oct. 11, 2001, now abandoned.

(51) Int. Cl.
*D04H 1/00* (2006.01)
*B32B 25/02* (2006.01)

(52) U.S. Cl. .............. 428/292.1; 428/295.1; 52/740.1

(58) Field of Classification Search ............. 428/474.9, 428/403, 292.1, 295.1, 397, 362; 296/187.03; 52/740.1
See application file for complete search history.

(56) References Cited

U.S. PATENT DOCUMENTS

| | | | | |
|---|---|---|---|---|
| 3,846,085 A | * | 11/1974 | Dunn, Jr. ................... | 428/574 |
| 3,920,879 A | * | 11/1975 | Segal et al. ............... | 428/474.9 |
| 4,257,835 A | * | 3/1981 | Bompard ................... | 156/92 |
| 4,477,522 A | * | 10/1984 | Sheehan .................... | 428/359 |
| 4,515,854 A | * | 5/1985 | Kogame et al. ............ | 442/329 |
| 4,600,631 A | | 7/1986 | Alei et al. | |
| 4,766,028 A | | 8/1988 | Rich | |
| 4,820,574 A | * | 4/1989 | Tesch ......................... | 428/362 |
| 4,911,980 A | * | 3/1990 | Tesch ......................... | 428/357 |
| 5,002,814 A | * | 3/1991 | Knack et al. ............... | 428/85 |
| 5,127,783 A | * | 7/1992 | Moghe et al. .............. | 411/411 |
| 5,266,393 A | | 11/1993 | Grajewski | |
| 5,419,949 A | | 5/1995 | Marx et al. | |
| 5,538,781 A | | 7/1996 | Rao et al. | |
| 5,587,239 A | * | 12/1996 | Ueba et al. ................. | 428/362 |
| 5,806,901 A | | 9/1998 | Tennyson et al. | |
| 5,851,665 A | * | 12/1998 | Marcus ....................... | 428/357 |
| 5,888,609 A | | 3/1999 | Karttunen et al. | |
| 5,914,163 A | | 6/1999 | Browne | |
| 5,915,775 A | | 6/1999 | Martin et al. | |
| 5,945,356 A | | 8/1999 | Pott | |
| 6,056,349 A | | 5/2000 | Seksaria et al. | |
| 6,062,632 A | * | 5/2000 | Brachos et al. ........ | 296/187.03 |
| 6,071,834 A | | 6/2000 | Martz | |

\* cited by examiner

*Primary Examiner*—N. Edwards
(74) *Attorney, Agent, or Firm*—Ralph E. Smith

(57) ABSTRACT

A reinforced polymer matrix composite material with anti-anisotropy reinforcement array is disclosed having coupled fiber reinforcement structures. The coupled fiber reinforcement structures are formed of a plurality of bound or bonded fibers, which form multi-dimensional structures capable of maintaining cross structure during molding. The structures are sized to allow their use in various molding processes. The coupled multiple fiber structures preferably have an aspect ratio of less than ten.

19 Claims, 4 Drawing Sheets

REINFORCEMENT ARRAY FOR HIGH MODULUS REINFORCEMENT OF COMPOSITES

RELATED APPLICATION(S)

This application is a continuation of patent application Ser. No. 09/976,349 filed Oct. 11, 2001, now abandoned.

FIELD OF THE INVENTION

This invention generally relates to reinforced polymer materials and, more particularly, to a polymer reinforcement having coupled fiber reinforcement structures which, when used individually or in combination in a polymer matrix, provide a reinforced composite having highly robust and reliable isotropic material properties.

BACKGROUND OF THE INVENTION

With ever increasing pressure from automotive consumers, flexibility and adaptivity in the design of vehicle structural components are increasingly required in order to provide a vehicle adapted to meet the broad customer demand. Further, with increased social awareness of a vehicle's impact on the environment, there is an increasing demand to minimize the overall mass of the vehicle while still meeting the feature requirements of the consumer. By reducing the mass of the structural components of the vehicle, several goals can be achieved. First, the overall weight of the vehicle can be minimized, thereby reducing the power and fuel required to operate the vehicle. Secondly, reduction of the mass of the structural components allows for the optimization of the interior volume of the vehicle, increasing occupant comfort and vehicle storage capacity.

The need for reductions in the weight of structural components in vehicles has led to a more efficient use of engineered materials having very high stiffness properties. Various types of engineered materials have been proposed to handle this ever-increasing desire for a reduction in weight of the structural components of the vehicle. Injection-molded and compression-molded technologies for large automotive body parts have provided processing platforms for the development of these structural components. Inherent in the large size of the automotive body parts is a requirement of high resin flow during the molding process. These high resin flows very often lead to an often unpredictable and unacceptable anisotropy within the molded components.

The localized anisotropy, which often occurs when large composite material parts are molded by injection or compression molding, may lead to significant variations or deviations in localized material properties. The flow of the matrix material during the molding process often causes alignment of reinforcement particles which often having a high modulus and high aspect ratio. These reinforcement particles are incorporated in order to provide strength and modulus enhancements to a composite part. Anisotropic mechanical properties manifest themselves in performance of the parts by causing inferior strength and modulus in directions orthogonal or perpendicular to the flow-induced alignment. Anisotropic physical properties, such as coefficient of thermal expansion, manifests itself into warpage of the part, causing non-uniform shrinkage upon cooling after molding.

Flow induced anisotropy can be avoided by using reinforcements having aspect ratios approaching one, such as spheroids. This approach however does not provide the strength enhancement needed to meet mechanical and performance requirements of structural vehicle components. Further, it is also possible to employ the use of reinforcement particles that have physical and mechanical properties that match those of the matrix. This approach, however, provides little or no enhancement of the mechanical properties of the composite structure.

A need, therefore, exists for a reinforced composite material for very large automotive components, such as vehicle body panels, vehicle frames or truck beds, that possess a very high stiffness and yet has of sufficient fatigue strength to maintain a vehicle body component over the life span of a vehicle. A need also exists for large injection molded or compression molded vehicle body parts having close to isotropic material properties to avoid post-molding deformation during cooling and inferior structural performance during use.

SUMMARY OF THE INVENTION

In accordance with the teachings of the present invention, a reinforced polymer material is disclosed having coupled multi-fiber structures with an aspect ratio of less than ten. The coupled multi-fiber structures increase the tailorability and tuneability of the stiffness and properties of the composite and allow for increases in vehicle component design flexibility by virtue of its simplicity and use of known manufacturing techniques. Also as the material allows for the formation of generally isotropic materials using standard injection and compression molding techniques, component mass can be reduced, thus increasing the fuel economy of a vehicle.

In one embodiment of the invention, a reinforced material includes a polymer matrix and at least one high aspect ratio fiber bound together in a multidimensional array to form a structure having an aspect ratio approaching one.

In another embodiment, a pair of fibers is coupled together at a fiber interface to generally form a cross structure. The fiber and fiber interface properties allow for the maintenance of a cross structure during an injection or compression molding process.

In another embodiment, pluralities of fibers are coupled together at fiber interfaces to generally form a generally planar structure. These generally flat structures maintain their shape during an injection or compression molding process.

The use of the present invention provides a reinforced composite material with improved isotropic properties. By adjusting the volume fraction of the reinforcement, the stiffness of the reinforcement fibers, and the molecular weight of the matrix, the stiffness of the material can be significantly increased. As a result, the aforementioned disadvantages associated with currently available methods for producing larger vehicle components using engineered materials have been substantially reduced or eliminated.

Further areas of applicability of the present invention will become apparent from the detailed description provided hereinafter. It should be understood that the detailed description and specific examples, while indicating preferred embodiments of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Moreover, while various specific fibers and coupled fiber reinforcement structures are disclosed, it is understood by those skilled in the art that they are merely exemplary and other specific reinforcement structures or matrices may be used.

Figure 1:
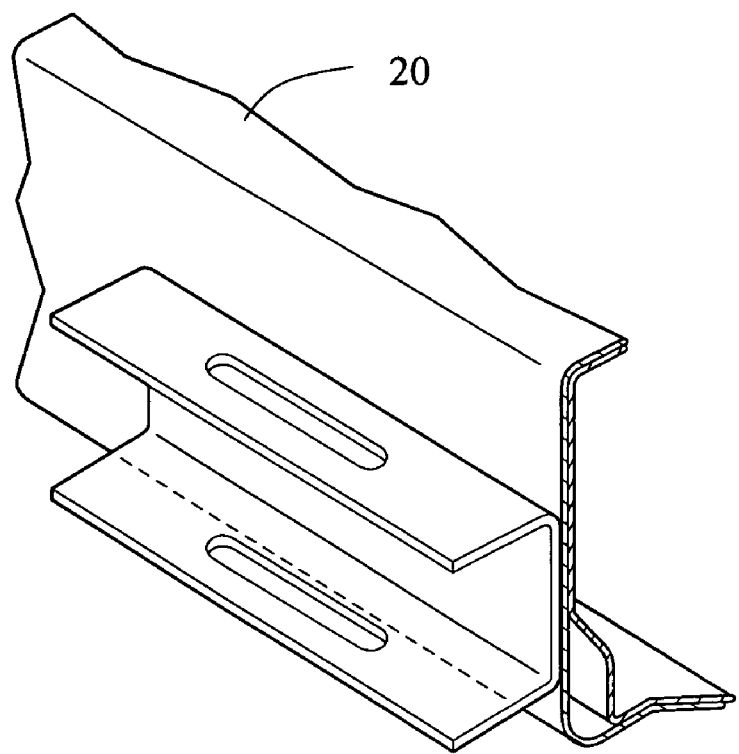
FIG. 1 is a perspective view of an automotive component using the reinforced composites conforming to the teachings of the current invention.

FIG. 1 represents a vehicle body component 20 formed by injection molding or compression molding technologies utilizing the coupled fiber reinforcement structure 22 of the present invention. The component is formed utilizing a large mold, which requires high flow rates. These high flow rates generally cause adverse reinforcement alignments seen in prior art systems. Fascia and body panel applications have requirements where the modulus must be in range from 200,000 psi to 400,000 psi (1.4 GPa to 2.8 GPa) and semi-structural components where the modulus requirements range from 500,000 psi to 1 million psi (3.45 GPa to 6.9 GPa).

To achieve these moduli, the vehicle body component 20 uses the coupled fiber reinforcement structure 22, which incorporate high-modulus reinforcement fiber materials arranged and formed to retain a jointed cross structure during molding. These materials include, but are not limited to, steels with a tensile modulus of 30 million psi (207 GPa), Kevlar with a tensile modulus of 19 million psi (124 GPa), E-glass with a tensile modulus of 10.5 million psi (72.4 GPa), aluminum with a tensile modulus of 10 million psi (70 GPa), and carbon (graphite) with a tensile modulus of 32 to 100 million psi (222 to 690 GPa).

As is known, the modulus of a composite material is a function of the volume fraction and the moduli of each component, that is the matrix and reinforcement. It is envisioned that the coupled fiber reinforcement structure 22 are disposed within known matrices such as epoxy resin, polyester resins, vinyl-ester resins, phenolic resins or other resins such as polyimides, bismaleimides, and polybenzimidazoles. Further, the matrix may be a form of thermoplastics such as polypropylene polycarbonates, polysulphones, polyether-ether-ketone (PEEK) and polyamides.

The coupled fiber reinforcement structures 22 are composed of high aspect ratio particles which are bound in two or three dimensional arrays such that the aspect ratio of the array preferably approaches one. It is preferred that these high modulus fibers be glass fibers with a tensile strength of 260,000 psi (1.8 GPa) and a tensile modulus of approximately 10 million psi (76 GPa) and that the fibers be five to twenty micrometers in diameter, and preferably ten micrometers in diameter and about 0.2 to 0.8 millimeters in length. The length of these fibers allow for the proper flow without destruction through an injection molding machine and are restricted only by the cost and manufacturing constraints. Other fibers, materials, dimensions, and array configurations can be used for other applications. In injection molding applications, the major dimension of the coupled fiber reinforcement structures 22 must always be small enough to pass through all orifices without catastrophic deformation of the coupled fiber reinforcement structures 22. This size limit would not apply to a compression molding system.

Figure 2:
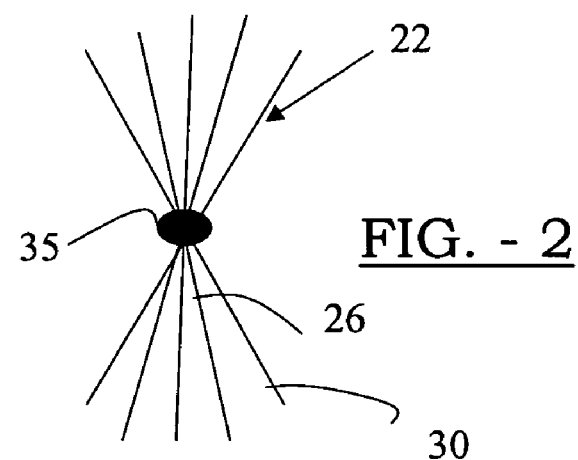
FIG. 2 is a perspective of a reinforcement structure conforming to the teachings of the current invention.

FIG. 2 depicts a single three dimensional reinforcement structure conforming to the teachings of the current invention. Because the reinforcement structure 22 has an overall aspect ratio approaching one while having individual fibers 26 having a much higher aspect ratio, a composite formed of this material has the advantages of a composite utilizing high aspect ratio fibers without the problems of production induced anisotropy. Critical to the use of the invention is an ability of the matrix material to properly wet and bond to the surface of the coupled fiber reinforcement structure 22. Additionally, the configuration of the reinforcement structure must allow for the matrix material 33 to flow into the interstices 30 between the fiber 26 of the reinforcement. The fibers 26 are bonded 35 by use of heat or adhesive. The bond 35 can take the form of a thermoplastic coating (not shown) on the fiber 26. This coating can be melted to facilitate joining of the fibers 26.

Figure 3:
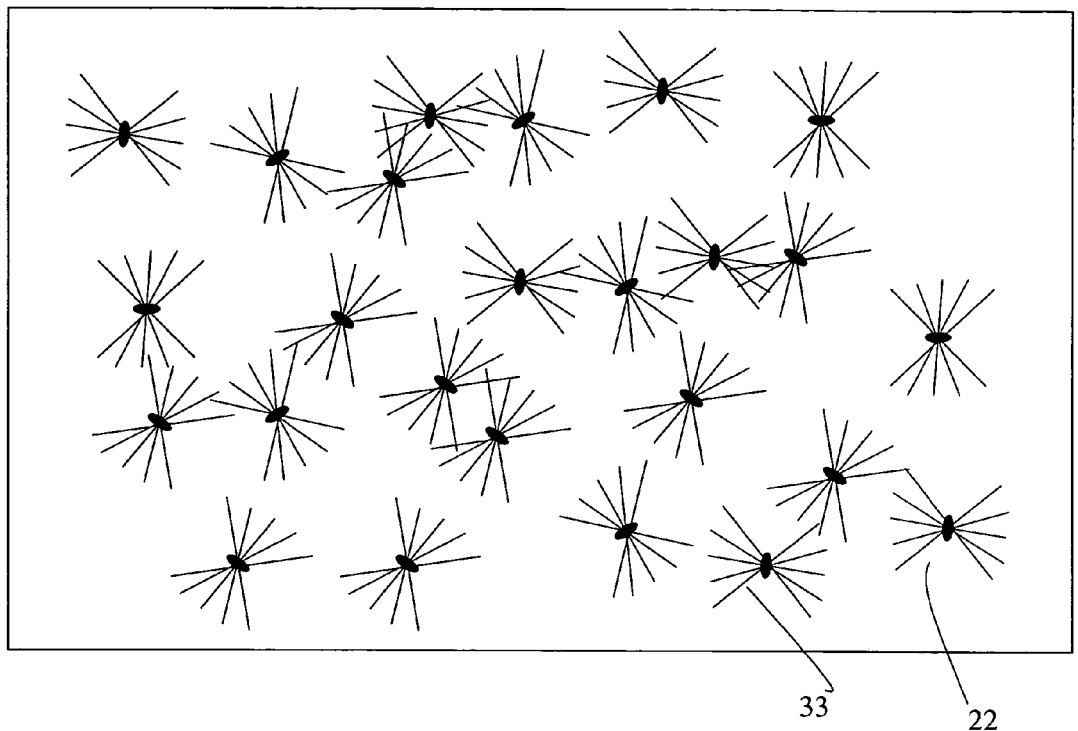
FIG. 3 is a composite material using the reinforcement structure of FIG. 2.

FIG. 3 represents a composite material 24 utilizing the coupled fiber reinforcement structure 22 is seen in FIG. 2. As can be noted, while the aspect ratio for any particular particle can be significantly greater than one, the aspect ratio for the coupled fiber reinforcement structure 22 preferably less than ten and even more preferably less than five and most preferably about one.

Figure 4:
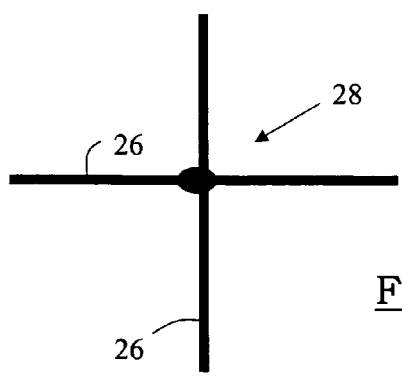
FIG. 4 is a two fiber multidimensional reinforcement structure conforming to the teachings of the current invention.

FIG. 4 represents a pair of fibers 26 generally configured into a cross to form a two-dimensional coupled fiber reinforcement structure 22. Each fiber 26 is bound to each other fiber 26 so as to minimize the amount of rotation between the cross fibers and retain the joint 35 during processing. This leaves a generally planar structure, which has an overall height to width ratio close to one.

Figure 5:
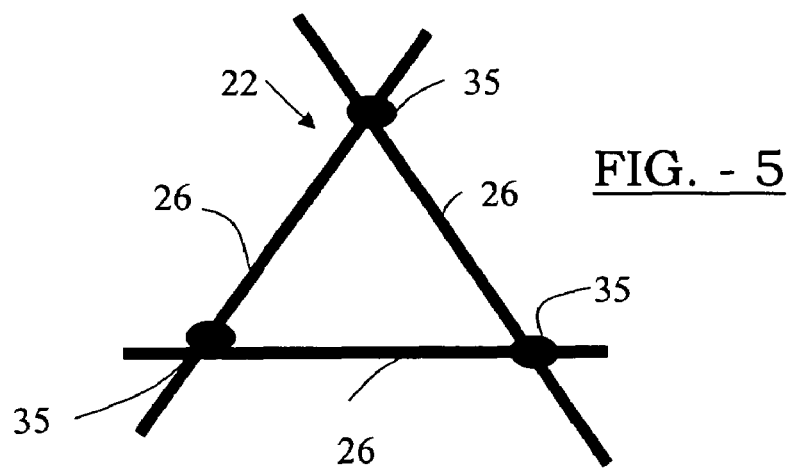
FIG. 5 is a three fiber multidimensional reinforcement structure conforming to the teachings of the current invention.
Figure 6:
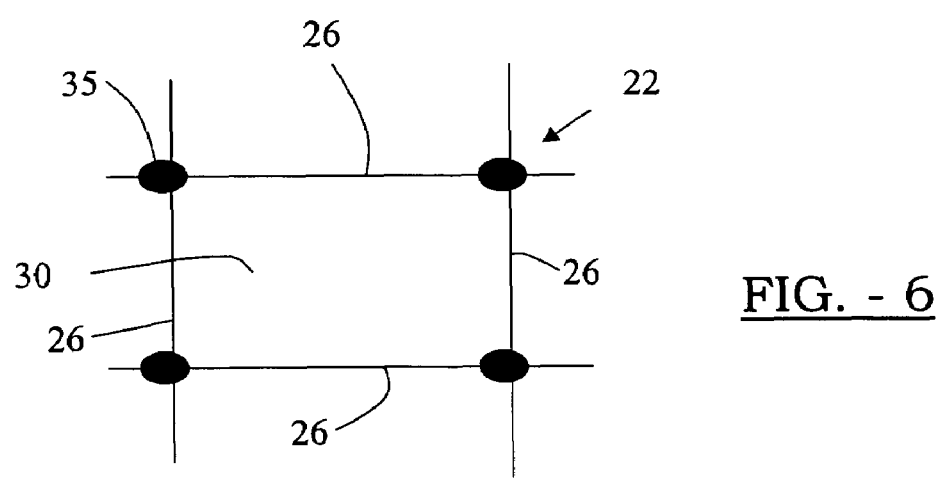
FIG. 6 is a four fiber multidimensional reinforcement structure conforming to the teachings of the current invention.

As can be seen in FIGS. 5 and 6, multiple configurations utilizing a plurality of fibers 26 can be combined to produce generally two dimensional structures which have a height to width ratio of approximately one. Prior to joining, the fibers 26 can be arranged into any two dimensional shape such as a triangle or square e.g. In any location that one fiber 26 or portion of a fiber 26 contacts another fiber 26 or portion of a fiber 26, the fibers 26 are bonded 35. The fibers are in one embodiment bonded to each other to form a joint 35 using heat, or adhesive, or other suitable fixation mechanisms to form a cohesive joint 35.

FIG. 6 depicts the preferred embodiment where two generally parallel pairs of fiber are orthogonally positioned with respect to each other to form a two-dimensional lattice like structure. As with the previous embodiment, the fibers are between 0.2 to 0.8 mm long and are coupled in a fashion so that they will maintain their height to width ratio during the molding process. By forming a structure which allows the fluid of the matrix material 33 to flow through the interstices 30 of the coupled fiber reinforcement structure 22, random distributions of the coupled fiber reinforcement structures 22 throughout the matrix can be achieved. The two-dimensional structure can be formed by arranging and bonding a woven mat of reinforcement fibers. The woven mat can be cut or chopped into an appropriate size.

Figure 7:
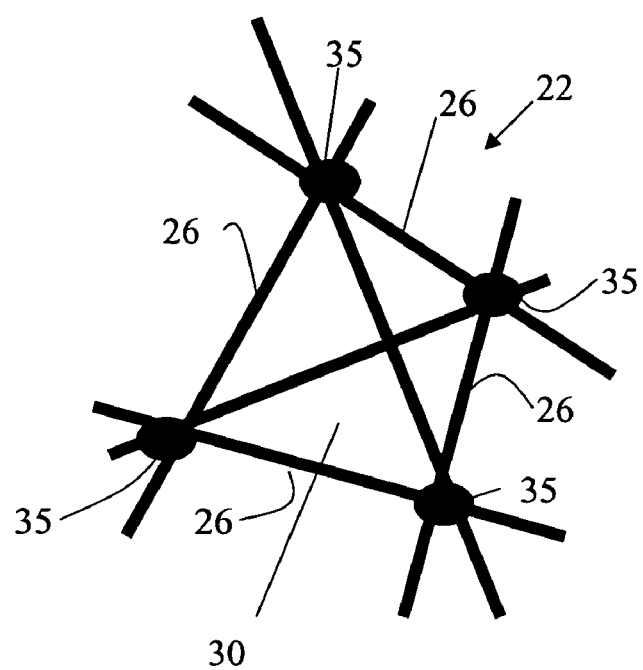
FIG. 7 is a three dimensional six fiber structure conforming to the teachings of the present invention.
Figure 8:
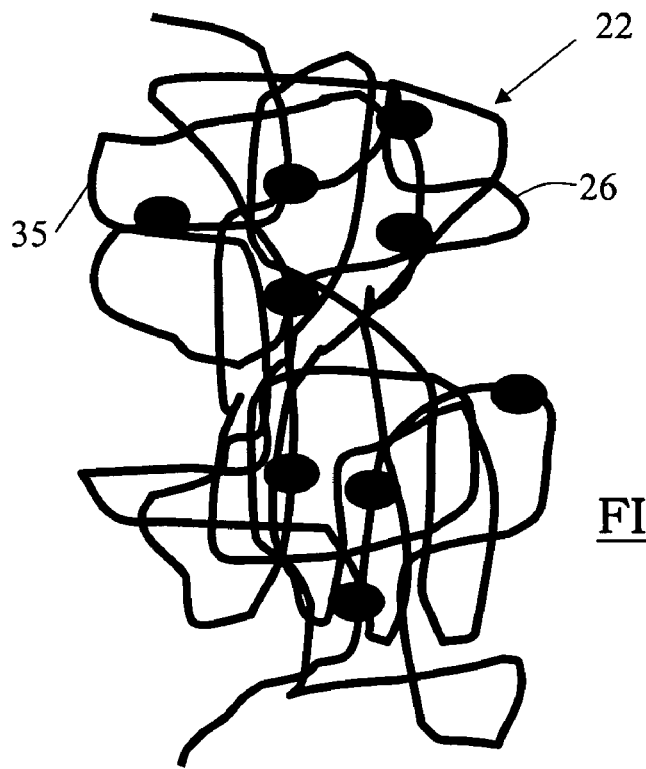
FIG. 8 is a single fiber multidimensional reinforcement conforming to the teachings of the current invention.

FIGS. 7 and 8 depict three-dimensional variations of the coupled fiber reinforcement structures 22. As can be seen in FIG. 7, various geometric configurations can be produced using the fibers 26. It is envisioned that the structure can be arranged by weaving and coupling the fibers 26 prior to being cut or chopped into an appropriate sized coupled fiber reinforcement structures 22.

FIG. 8 discloses a coupled fiber reinforcement structure 22 formed from a single fiber 26 which is "bunched" and bonded upon itself to form a generally hollow reinforcement structure. At every location that the fiber contacts itself, a bond 35 is made. This allows the use of a single fiber 26 to form a "burr". As with the other coupled fiber reinforcement structures 22, the resulting dimensions must allow flow through the nozzles and orifices of an injection-molding machine.

The description of the invention is merely exemplary in nature and, thus, variations that do not depart from the nature of the invention are intended to be within the scope of the invention. Such variations are not to be regarded as a departure from the spirit and scope of the invention.

What is claimed is:

1. A composite material comprising:
   a matrix phase; and
   a plurality of discrete bonded fiber reinforcement structures disposed within the matrix phase and each formed of at least one high aspect ratio fiber which includes at least one bond joint and wherein each bonded fiber reinforcement structure has an aspect ratio that is greater than zero and equal to or less than ten and wherein the high aspect ratio fiber has a length in the range of about 0.2 to about 0.8 millimeters.

2. The composite material of claim 1 wherein at least one bonded fiber reinforcement structure comprises a pair of fibers adjoined by the bond joint, whereby said bond joint substantially maintains a its shape of the bonded fiber reinforcement structure during a molding process.

3. The composite material of claim 1 wherein at least one bonded fiber reinforcement structure forms a bonded triangular structure.

4. The composite material of claim 1 wherein at least one bonded fiber reinforcement structure forms a bonded square structure.

5. The composite material of claim 1 wherein at least one bonded fiber reinforcement structure includes a plurality of bond joints formed by a first and second pair of parallel fibers, said first and second pair being bonded orthogonally to each other.

6. The composite material of claim 1 wherein said fibers are selected from the group consisting essentially of carbon fiber and glass fiber.

7. The composite material of claim 1 wherein said matrix is a thermosettable polymer.

8. The composite material of claim 7 wherein the matrix material is selected from the group consisting essentially of epoxy resin, polyester resins, vinylester resins, and phenolic resins.

9. The composite material of claim 7 wherein the matrix material is selected from the group consisting essentially of polyimides, bismaleimides, and polybenzimidazoles.

10. The composite material of claim 1 wherein said matrix is a thermformabie polymer.

11. The composite material of claim 10 wherein the matrix material is selected from the group consisting essentially of polycarboriates, polysuiphones, polyether-etherketone and polyamides.

12. The composite material of claim 1 wherein at least one bonded fiber reinforcement structure has an aspect ratio that is greater than zero and equal to or less than five.

13. The composite material of claim 1 wherein at least one bonded fiber reinforcement structure has an aspect ratio of about one.

14. The composite material of claim 1 wherein at least one bonded fiber reinforcement structure has a height to width ratio of about one.

15. A bonded fiber reinforcement structure comprising:
   a pair of fibers bonded at at least one joint, whereby said joint substantially maintains a shape of the reinforcement structure during a molding process; wherein said bonded fiber reinforcement structure has an aspect ratio that is greater than zero and equal to or less than ten and wherein a fiber of the pair of fibers has a length in the range of about 0.2 to about 0.8 millimeters.

16. The bonded fiber reinforcement structure of claim 15 wherein the pair of fibers are parallel and the bonded fiber reinforcement structure further comprises a second pair of parallel fibers, said pair and second pair being bonded orthogonally to each other.

17. The bonded fiber reinforcement structure of claim 15 wherein said fibers are selected from the group consisting essentially of carbon fiber and glass fiber.

18. The composite material of claim 1, wherein the high aspect ratio fiber has a diameter in the range of about 5 to about 20 micrometers.

19. The bonded fiber reinforcement structure of claim 15, wherein the high aspect ratio fiber has a diameter in the range of about 5 to about 20 micrometers.

* * * * *